(12) United States Patent
Shoshan et al.

(10) Patent No.: US 11,463,152 B2
(45) Date of Patent: *Oct. 4, 2022

(54) MOVING CELLULAR COMMUNICATION SYSTEM

(71) Applicant: ELTA SYSTEMS LTD., Ashdod (IL)

(72) Inventors: Yaakov Shoshan, Ashkelon (IL); Jacob Tzlil, Rishon Lezion (IL); Gil Koifman, Petach-Tikva (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/986,637

(22) Filed: Aug. 6, 2020

(65) Prior Publication Data

US 2021/0099225 A1 Apr. 1, 2021

Related U.S. Application Data

(63) Continuation of application No. 16/436,048, filed on Jun. 10, 2019, now Pat. No. 10,743,193, which is a
(Continued)

(30) Foreign Application Priority Data

Aug. 29, 2011 (IL) .......................................... 214867

(51) Int. Cl.
*H04B 7/155* (2006.01)
*H04W 4/90* (2018.01)
(Continued)

(52) U.S. Cl.
CPC .......... *H04B 7/15507* (2013.01); *H04B 7/15* (2013.01); *H04B 7/18504* (2013.01);
(Continued)

(58) Field of Classification Search
CPC ..... H04W 24/10; H04W 92/18; H04W 28/06; H04W 4/40; H04W 24/02; H04W 76/00;
(Continued)

(56) References Cited

U.S. PATENT DOCUMENTS 4,236,158 A 11/1980 Daniel
5,357,257 A 10/1994 Nevin
(Continued)

FOREIGN PATENT DOCUMENTS

JP 2012253710 A * 12/2012 ............ H04W 60/04
KR 2009-010000 9/2009
(Continued)

OTHER PUBLICATIONS

M. Torlak, "Spatial Array Processing" pp. 1-25. Telecommunications & Information Sys. Eng. The University of Texas at Austin dated Oct. 26, 1998.
(Continued)

*Primary Examiner* — Daniel Lai
(74) *Attorney, Agent, or Firm* — Browdy and Neimark, PLLC

(57) ABSTRACT

A cellular system comprising at least one moving non-stationary base station for enabling cellular communication between at least two mobile stations in a geographic area that lacks adequate cellular coverage by at least one stationary base station.

19 Claims, 12 Drawing Sheets

Related U.S. Application Data continuation of application No. 16/031,055, filed on Jul. 10, 2018, now Pat. No. 10,362,492, which is a continuation of application No. 15/366,371, filed on Dec. 1, 2016, now Pat. No. 10,045,233, which is a continuation of application No. 14/241,673, filed as application No. PCT/IL2012/050332 on Aug. 29, 2012, now Pat. No. 9,544,783.

(51) Int. Cl.

| | | |
|---|---|---|
| H04B 7/26 | (2006.01) | |
| H04B 7/185 | (2006.01) | |
| H04W 84/00 | (2009.01) | |
| H04B 7/15 | (2006.01) | |
| H04W 16/10 | (2009.01) | |
| H04W 16/22 | (2009.01) | |
| H04W 16/26 | (2009.01) | |
| H04W 16/32 | (2009.01) | |
| H04W 36/08 | (2009.01) | |
| H04W 40/02 | (2009.01) | |
| H04W 64/00 | (2009.01) | |
| H04W 12/08 | (2021.01) | |
| H04W 24/02 | (2009.01) | |
| H04W 72/08 | (2009.01) | |
| H04W 40/22 | (2009.01) | |

(52) U.S. Cl.
CPC ............ *H04B 7/2606* (2013.01); *H04W 4/90* (2018.02); *H04W 12/08* (2013.01); *H04W 16/10* (2013.01); *H04W 16/22* (2013.01); *H04W 16/26* (2013.01); *H04W 16/32* (2013.01); *H04W 24/02* (2013.01); *H04W 36/08* (2013.01); *H04W 40/026* (2013.01); *H04W 64/003* (2013.01); *H04W 72/082* (2013.01); *H04W 84/005* (2013.01); *H04W 40/22* (2013.01); *H04W 64/006* (2013.01)

(58) Field of Classification Search
CPC ..... H04W 76/14; H04W 24/04; H04W 36/14; H04W 4/06; H04W 88/04; H04W 88/08; H04W 28/00; H04W 4/00; H04W 4/02; H04W 4/023; H04W 4/08; H04W 4/44; H04W 4/90; H04W 52/0235; H04W 52/18; H04W 52/24; H04W 12/08; H04W 72/082; H04W 16/10; H04W 16/22; H04W 16/26; H04W 16/32; H04W 36/08; H04W 40/026; H04W 64/003; H04W 84/005; H04W 40/22; H04W 64/006; H04W 84/047; H04W 4/029; H04W 4/80; H04W 88/06; H04W 84/12; H04W 84/18; H04W 64/00; H04W 76/10; H04W 8/005; H04W 84/045; H04W 4/021; H04W 4/025; H04W 28/08; H04W 76/20; H04W 28/16; H04W 84/00; H04W 28/12; H04W 28/0226; H04L 1/1812; H04L 41/0654; H04L 2001/0097; H04B 7/0417; H04B 7/15507; H04B 7/18504; H04B 7/2606; H04B 7/15; H04B 7/155; H04B 7/15542; H04B 7/14; H04B 7/15557; H04B 7/15564; H04B 7/15592; H04B 7/1555; H04B 17/40
See application file for complete search history.

(56) References Cited

U.S. PATENT DOCUMENTS

| | | |
|---|---|---|
| 5,363,111 A | 11/1994 | Murphy |
| 5,990,831 A | 11/1999 | McDowell |
| 6,115,409 A | 9/2000 | Upadhyay et al. |
| 6,246,693 B1 | 6/2001 | Davidson et al. |
| 6,971,063 B1 | 11/2005 | Rappaport et al. |
| 8,014,029 B2 | 9/2011 | Tripp |
| 8,676,144 B2 | 3/2014 | Guo et al. |
| 8,718,560 B2 | 5/2014 | Jin et al. |
| 9,654,988 B2 | 5/2017 | Weisbart |
| 2004/0146024 A1 | 7/2004 | Li et al. |
| 2004/0198386 A1 | 10/2004 | Dupray |
| 2006/0002326 A1* | 1/2006 | Vesuna ................ H04W 16/18 370/328 |
| 2006/0159033 A1 | 7/2006 | Suzuki et al. |
| 2008/0039146 A1 | 2/2008 | Jin |
| 2008/0095282 A1 | 4/2008 | Walton et al. |
| 2008/0260000 A1 | 10/2008 | Periyalwar et al. |
| 2009/0096686 A1 | 4/2009 | Niculescu et al. |
| 2009/0172397 A1 | 7/2009 | Kim |
| 2009/0227259 A1 | 9/2009 | Min |
| 2009/0247182 A1 | 10/2009 | Tamate |
| 2009/0257471 A1 | 10/2009 | Tanaka et al. |
| 2009/0323836 A1 | 12/2009 | Nakano et al. |
| 2009/0325479 A1 | 12/2009 | Chakrabarti et al. |
| 2010/0303182 A1 | 12/2010 | Daneshrad |
| 2010/0309834 A1 | 12/2010 | Fischer et al. |
| 2012/0021687 A1 | 1/2012 | Parker |
| 2012/0033574 A1 | 2/2012 | Holm |
| 2012/0287781 A1 | 11/2012 | Maria |
| 2013/0089009 A1 | 4/2013 | Li et al. |
| 2013/0182785 A1 | 7/2013 | Koifman et al. |
| 2015/0245363 A1 | 8/2015 | Lee et al. |

FOREIGN PATENT DOCUMENTS

| | | |
|---|---|---|
| WO | 0115466 A1 | 3/2001 |
| WO | 2010105210 A2 | 9/2010 |
| WO | 2011092698 A1 | 8/2011 |
| WO | 2011158230 A2 | 12/2011 |
| WO | 2012014194 A2 | 2/2012 |
| WO | 2013027218 A2 | 2/2013 |

OTHER PUBLICATIONS

Hafeth Hourani, "An Overview of Adaptive Antenna Systems", Helsinki University of Technology, Postgraduate Course in Radio Communications (2004/2005), available on the internet: http://www.comlab.hut.fi/opetus/333/2004_2005_slides/Adaptive_antennas_text.pdf.

Chris Loadman et al., "An Overview of Adaptive Antenna Technologies for Wireless Communications", Chen & Dylan Jorgensen (Dalhousie University), Communication Networks and Services Research Conference 2003, pp. 1-5, Session A3, also available on the internet: http://www.cs.unb.ca/cnsrproject/Download/PDF/a3a.pdf.

I. Santamaria et al., Optimal MIMO Transmission Schemes with Adaptive Antenna Combining in the RF Path, 16th European signal processing conference, Aug. 25-29, 2008, also available on the internet: http://gtasweb.dicom.unican.es/files/Publicaciones/Congresos/Eusipco2008_MIMAX.pdf.

Suismita DAS, "Smart Antenna Design for Wireless Communication using Adaptive Beam-forming Approach" Journal pp. 1-5. Electrical Engineering Department National Institute of Technology dated Nov. 19, 2008.

Peter Kootsookos et al., "Imposing pattern nulls on broadband array responses", Journal Acoustical Society of America, 105 (6), Jun. 1999.

Li et al., "A paper: An Examination of the Processing Complexity of an Adaptive Antenna System for WiMAX", 2nd IEE/EURASIP DSPEnabledRadio Conference, Southampton, Sep. 2005, also avail-

(56) References Cited

OTHER PUBLICATIONS able on the internet: http://macltd.com/datafile_downloads/MAC%20Ltd%20-%20AAS%20for%20WiMAX.pdf.

B. Widrow et al., "Adaptive Antenna Systems", IEEE proceedings, vol. 55, No. 12, Dec. 1967, also available on the internet: http://isl-www.stanford.edu/~widrow/papers/j1967adaptiveantenna.pdf.

John Litva et al., "Digital Beamforming in Wireless Communications", Book, Artech House (1996).

Lal Chand Godara, "Smart Antennas", Book, pp. 1-458, CRC Press (2004).

Frank Gross, "Smart Antennas for Wireless Communications", Book, The McGraw-Hill, pp. 1-285, (2005).

Syed Ahson et al., "WiMAX Technologies, Performance Analysis, and QoS", Book, pp. 1-296, CRC Press, Taylor and Francis Group (2008).

W. C. Cheuk et al., Null-steering LMS Dual-Polarised Adaptive Antenna Arrays for GPS, Journal of Global Positioning Systems (2005), vol. 4, No. 1-2: 258-267.

3GPP TS 36.300—Evolved Universal Terrestrial Radio Access (E-UTRA) and Evolved Universal Terrestrial Radio Access Network (E-UTRAN); Overall description; Stage 2, also available from http://www.3gpp.org/ftp/Specs/html-info/36300.htm printed Oct. 2013.

3GPP TS 36.302—Evolved Universal Terrestrial Radio Access (E-UTRA); Services provided by the physical layer, also available from http://www.3gpp.org/ftp/Specs/html-info/36302.htm, printed Oct. 2013.

http://en.wikipedia.org/w/index.php?title=Wideband&oldid=522580153, Widebrand, printed Oct. 28, 2013.

Budsabathon M et al: "Optimum Beamforming for Pre-FFT OFDM Adaptive Antenna Array", IEEE Transactions on Vehicular Technology, vol. 53, No. 4, Jul. 1, 2004, pp. 945-955, XP11115402, IEEE Service Center, Piscataway, NJ, US.

Fazel K: "Narrow-band interference rejection in orthogonal multi-carrier spread-spectrum communications", Universal Personal Communications, 1994, Sep. 27, 1994, pp. 46-50, XP010131551, New York, NY, USA, IEEE.

* cited by examiner

MOVING CELLULAR COMMUNICATION SYSTEM

FIELD OF THE INVENTION

This invention relates to moving cellular communication systems.

BACKGROUND OF THE INVENTION

The ever increasing popularity of cellular communication has led to dramatic improvements in cellular infrastructure deployment in urban areas as well as on highways in rural environments in many countries over the globe. The introduction of the cellular 3G standard and the newer 4G standard has further encouraged significant investments for improving cellular coverage in such areas.

Cellular communication offers a versatile type of communication that is characterized by at least:
(a) communication at a variable distance sub-range that falls in the range of sub-meter (e.g. femto-cells) to more than 10 Km (e.g. macro-cells);
(b) communication of desired application including at least one of audio, video and data;
(c) communication in a variety of environments including at least one of urban, sub-urban and rural areas,
all using basically the same cellular mobile stations (e.g. cellular telephones, smart-phones or tablets).

However, the vast majority of the cellular infrastructures is of a stationary nature, namely utilization of stationary core segments and base stations. Whilst the efficient deployment of stationary infrastructure affords efficient cellular communication in many densely populated areas, it falls short in providing the same quality of service (or even any cellular coverage) in areas that lack adequate cellular infrastructure or are devoid of any infrastructure.

In addition, even geographical areas that have appropriate cellular coverage may be susceptible to degraded performance or even total collapse of cellular communication coverage, for instance resulting from natural disasters, for example such as when a hurricane storm significantly damages the stationary stations or cores.

This may not only adversely affect the ability of the population in the disaster area to contact each other, but also may hinder rescue efforts held by rescue forces such as the police, firemen and medical emergency forces who may require efficient cellular communication extremely useful for fulfilling their designated rescue tasks.

As an alternative to lack of cellular communication infrastructure, and considering for example a rescue task (e.g. extinguishing a fire spread over a large area), the rescue team may be required to employ various types of wireless communication devices, some of which are designated for short range communication (e.g. between firemen that are close to each other), others adapted for long range communication (e.g. between a fireman communicating with a pilot for directing an airplane carrying fire extinguishing substances towards a desired area). Certain devices are operable in rural environments but their functionality is adversely affected in urban environments. Some devices are adapted for voice application but cannot communicate video or data.

There is thus a need to provide a cellular system that employs non-stationary base station(s) utilizable in a geographical area that lacks adequate coverage for facilitating versatile communication.

SUMMARY OF THE INVENTION

In accordance with an aspect of the invention, there is provided a cellular system comprising at least one moving non-stationary base station for enabling cellular communication between at least two mobile stations in a geographic area that lacks adequate cellular coverage by at least one stationary base station.

In accordance with certain embodiments, there is further provided at least one stationary base station.

In accordance with certain embodiments of the invention, there is further provided at least one non stationary core segment.

In accordance with certain embodiments of the invention, said non stationary core segment being a simulated stationary network.

In accordance with certain embodiments of the invention, said non stationary base station being a moving relay.

In accordance with certain embodiments of the invention, there is further provided at least one stationary core segment and stationary base station.

In accordance with certain embodiments of the invention there is further provided support of dynamic topology in terms of at least variable number of non stationary base stations and number of mobile stations.

In accordance with certain embodiments of the invention, said dynamic topology includes multi-layer Hierarchical dynamic cellular network.

In accordance with certain embodiments of the invention, the system is operable in an adaptable network coverage mode for adequately supporting a static or dynamic deployment of cellular mobile stations.

In accordance with certain embodiments of the invention, said adaptable network coverage includes change of assignment of cellular mobile stations between non-stationary base stations.

In accordance with certain embodiments of the invention, said adaptable network coverage includes change of location of at least one non-stationary base station.

In accordance with certain embodiments of the invention, said adaptable network coverage includes change of transmission or reception characteristics of said non-stationary bases stations.

In accordance with certain embodiments of the invention, said transmission or reception characteristics are selected from a group includes antenna type, antenna pointing, antenna beam-width and transmission power.

In accordance with certain embodiments of the invention, the system is operable in 3G standard.

In accordance with certain embodiments of the invention, the system is operable in 4G standard.

In accordance with certain embodiments of the invention, the system is operable in WIMAX® standard.

In accordance with certain embodiments of the invention, the system is operable in areas of disaster where existing stationary cellular infrastructure malfunction.

In accordance with certain embodiments of the invention, said cellular communication is characterized by
   i) communication between at least two mobile stations at a variable distance that falls in the range of sub-meter to more than 10 Km;
   ii) communication of desired application including at least one of audio, video, messaging and data.

In accordance with certain embodiments of the invention, said cellular communication is further characterized by
   iii) communication in an environment including at least one of urban, sub-urban, rural. maritime and aerial.

In accordance with certain embodiments of the invention, said non stationary moving base station is carried by moving autonomous platform from a group that includes ground robot, unmanned aerial vehicle (UAV) or unmanned seaborne vessel.

In accordance with an aspect of the invention, there is provided a mobile station equipped with ICM and carry-able by a platform, in a cellular system comprising at least one moving non-stationary base station for enabling cellular communication between at least two mobile stations in a geographic area that lacks adequate cellular coverage by at least one stationary base station.

In accordance with certain embodiments of the invention, said cellular system further including at least one stationary base station.

In accordance with an aspect of the invention, there is provided a mobile station equipped with SM and carry-able by a platform, in a cellular system comprising at least one moving non-stationary base station for enabling cellular communication between at least two mobile stations in a geographic area that lacks adequate cellular coverage by at least one stationary base station.

In accordance with certain embodiments of the invention, said cellular system further including at least one stationary base station.

In accordance with an aspect of the invention, there is provided a non stationary base station equipped with ICM, in a cellular system comprising at least one moving non-stationary base station for enabling cellular communication between at least two mobile stations in a geographic area that lacks adequate cellular coverage by at least one stationary base station.

In accordance with an aspect of the invention, there is provided a non stationary core segment equipped with SM, in a cellular system comprising at least one moving non-stationary base station for enabling cellular communication between at least two mobile stations in a geographic area that lacks adequate cellular coverage by at least one stationary base station.

In accordance with an aspect of the invention, there is provided a cellular system comprising at least two moving non-stationary base stations for enabling cellular communication between at least two mobile stations in a geographic area that lacks adequate cellular coverage by at least one stationary base station.

A system according to any of the previous embodiments wherein the cellular system enables adaptable network coverage.

Furthermore, the adaptable network coverage can be one or more of the following types: distributed, centralistic, partly distributed and partially centralistic.

Furthermore, adaptation of the network coverage may be made autonomously by the moving non-stationary base station.

Furthermore, the system may be operable in the WiFi® standard.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
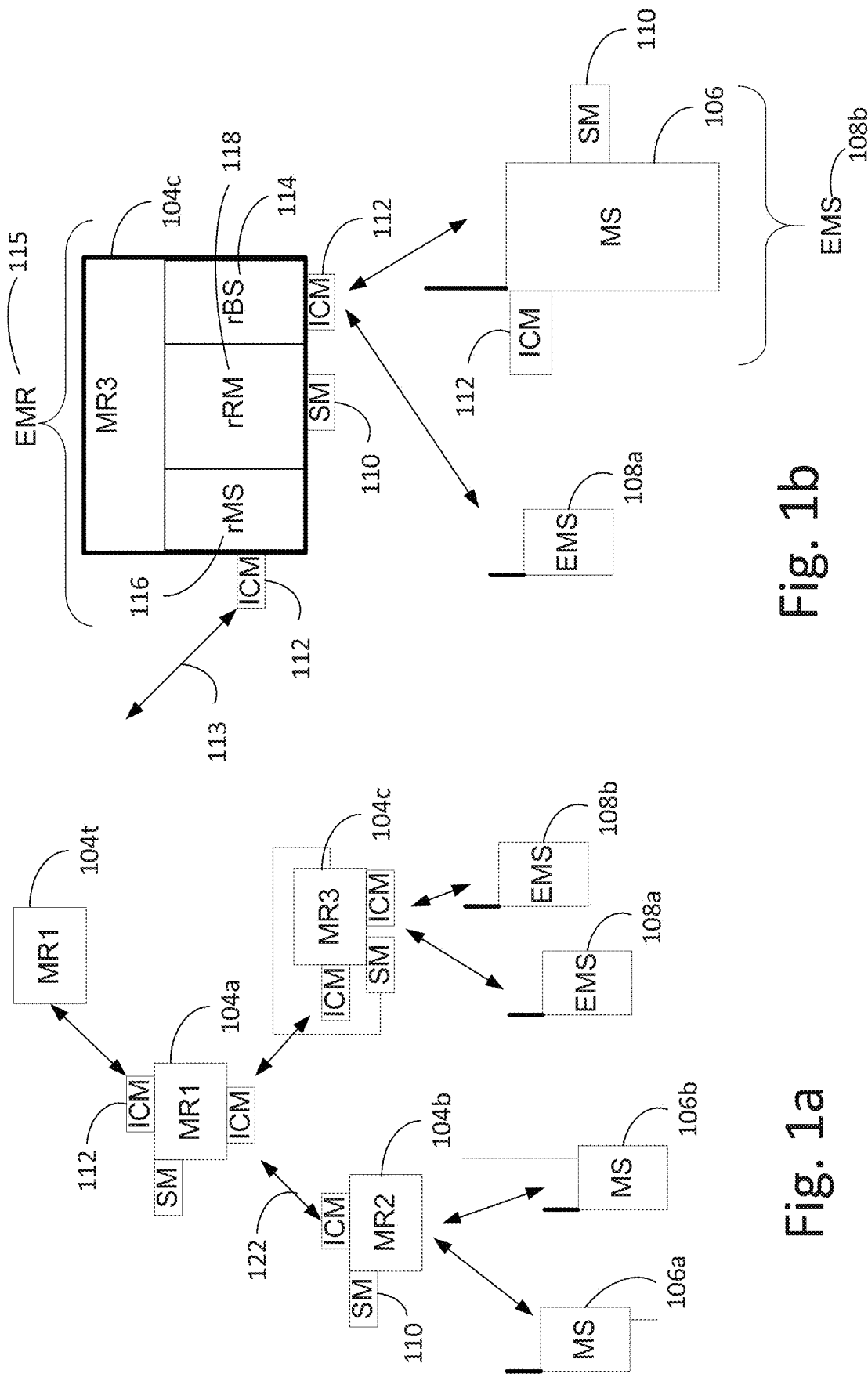
FIG. 1A-1B illustrate schematically generalized system architecture of the Moving Cellular Communication System, in accordance with certain embodiments of the invention.

FIG. 1a illustrates a Moving Cellular Communication System that includes (for example) three Moving Relays (MR) 104a, 104b and 104c that serves two Mobile Stations (MSs) 106a, 106b and two Enhanced Mobile Stations (EMSs) 108a, 108b. Each one of the moving relays is capable of moving while serving each one of the MSs or EMSs, as will be elaborated below. In addition, two add-on modules can be optionally connected to each MR or MS and turn them into enhanced MR (EMR) or enhanced MS (EMS) respectively. The add-on module types are Interference Cancellation Module (ICM) 112 and Security Module (SM) 110. The ICM role as described in more detail in co-pending PCT patent application no. PCT/IL2011/000468 filed on Jun. 13, 2011, entitled "System and Methods for Null Steering in a Multicarrier System" whose contents is incorporated herein by reference is for interference cancellation (whether intra-network or from out-of-network source). The intra-network interference can be or include, for example, the mutual interference between the relay Mobile Station (rRM) and the relay Base Station (rBS), or between Mobile Stations located in adjacent cells or between Base Stations located in adjacent cells. The out-of-network interference can, for example, originate in an adjacent different cellular system (e.g. at border areas) or by any other suitable wireless system or source. The SM is added for upgraded security as described in more detail in co-pending PCT patent application no. PCT/IL2011/000587 filed on Jul. 21, 2011, entitled "Switched Application Processor Apparatus for Cellular Devices" whose contents is incorporated herein by reference and in co-pending Israeli patent application filed Aug. 25, 2011, by applicant entitled "Network Environment Separation" whose contents is incorporated herein by reference.

Figure 7:
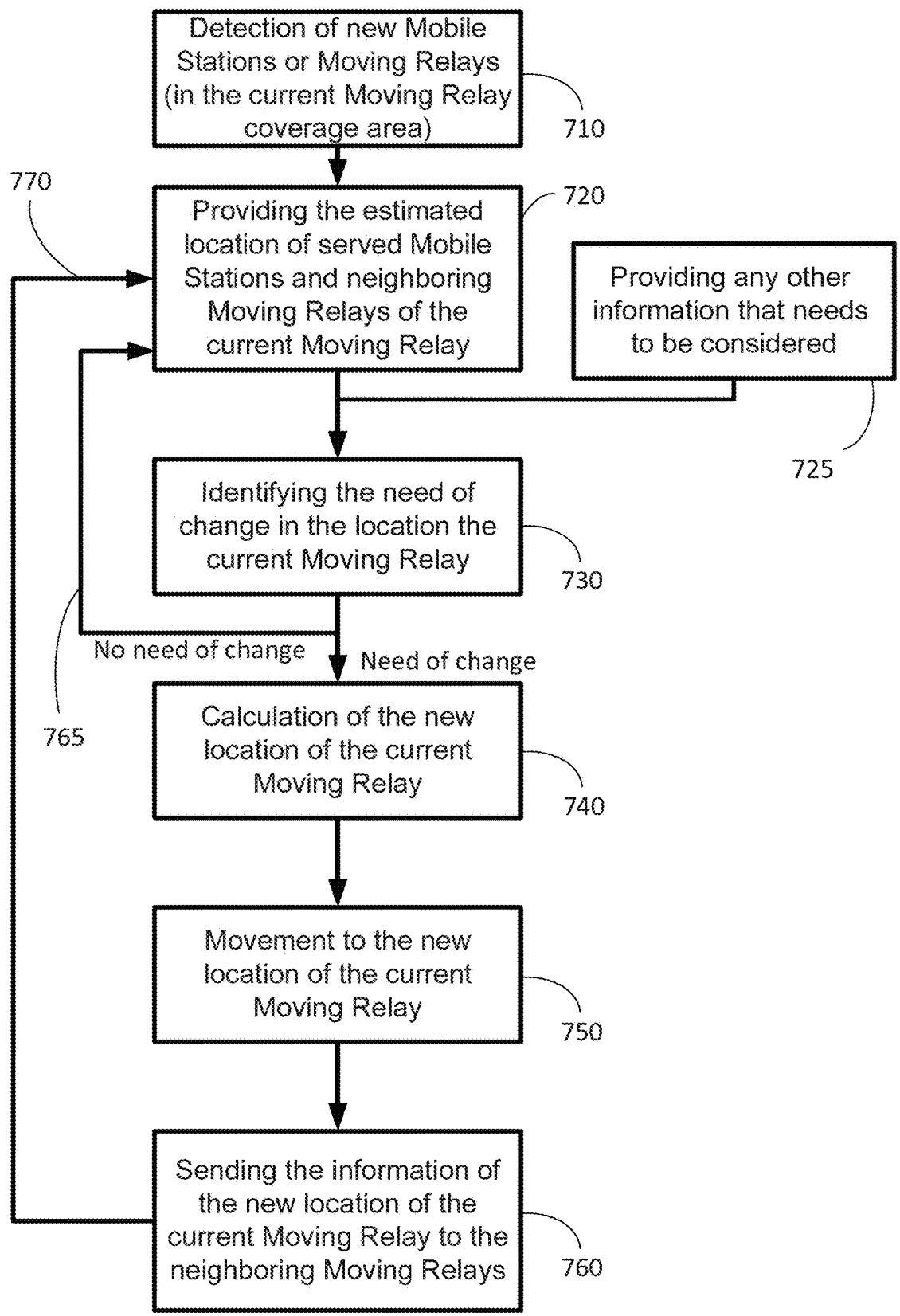
FIG. 7 illustrates schematically a flow chart of a sequence of operations for obtaining distributed adaptable network coverage, in accordance with certain other embodiments of the invention.
Figure 8:
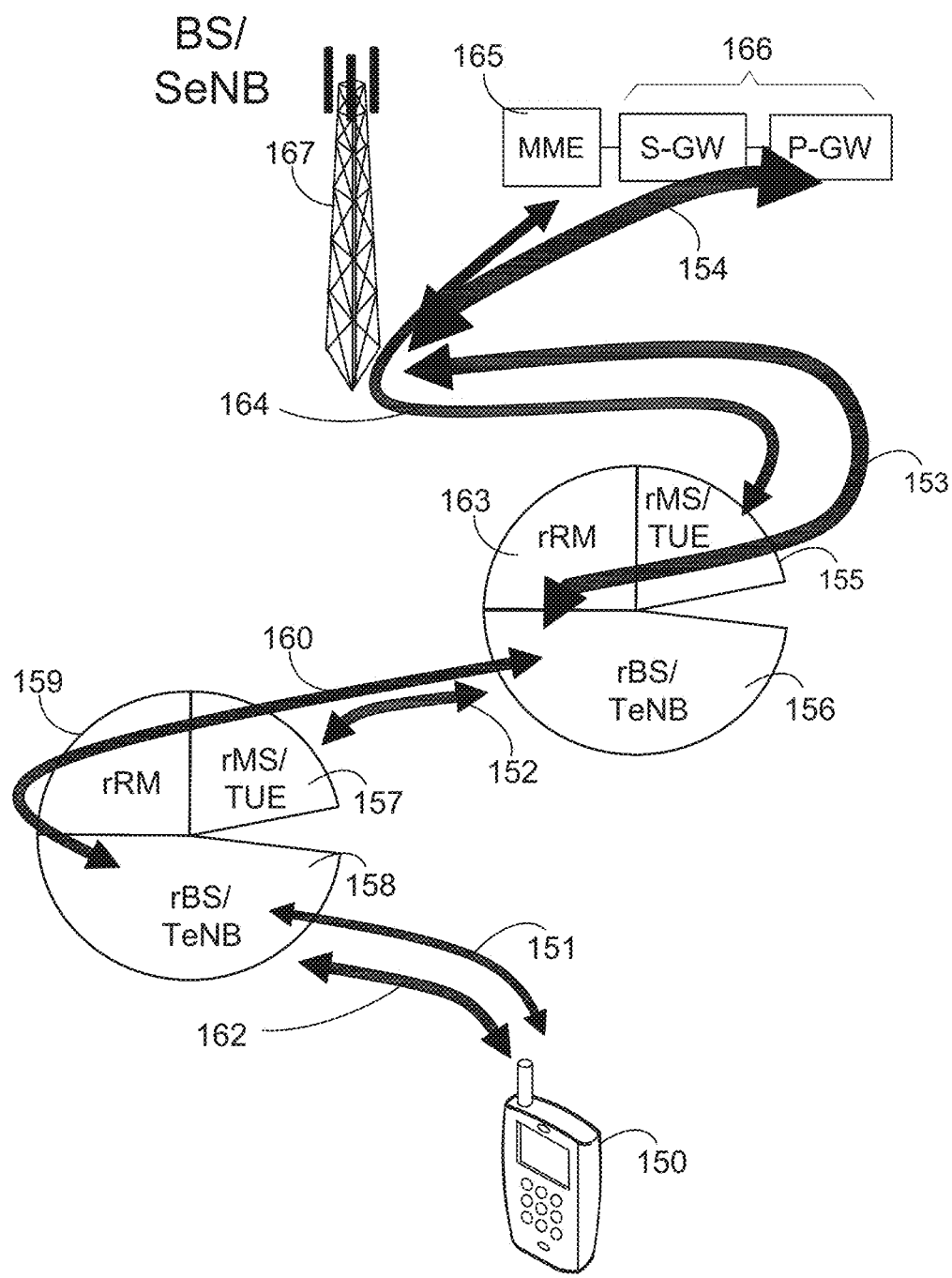
FIG. 8 is an example of communication in normal mode in a multi-hop scenario and a single mobile station.

For example, the SM can enable higher security application processing (Application Processor 2) to be used by the MS as seen e.g. in FIG. 8 of PCT/IL2011/000587 which depicts MS architecture incorporating SM as add-on to it (referenced there as 815). In addition, FIGS. 6 and 7 of PCT/IL2011/000587 illustrate outgoing and incoming sequences that can be implemented by EMS or EMR when it has SM attached to it.

It should be noted that the proposed cellular system can have all types and combinations of node, such as but not limited to: MS, MR, EMS, EMR. Each Enhanced node can have SM only or ICM only or any combination of both concurrently (i.e. 1 SM and 2 ICMs as in MR3 104c or 1 SM and 1 ICM as in MR2 104b, etc.).

FIG. 1b shows a zoom-in schematic view of a EMR 115 (in the presented example is MR3 104c and attached several add-on modules 112, 110) and also of an EMS (in the presented example is 108b). As can be seen, the MR consists of a base-station (rBS) 114 a relay resource manager (rRM) 118 and a link to other base station 113, which is implemented in the presented example as in-band backhauling using a local MS (rMS) 116 as described in more detail in co-pending PCT publication no. WO 2011/092698 published on Aug. 4, 2011 entitled "Cellular Communication System with Moving Base Stations and Methods and Apparatus Useful In Conjunction Therewith" whose contents is incorporated herein by reference. It should be noted that the backhauling link to other base station can be also implemented using any other technique, such as a dedicated backhauling link (e.g. using satellite communication, 3G/UMTS/HSPA, WiFi® or microwave link). The add-on modules of the MR, SM 110 and two ICMs 112, are shown. Adding them (or part of them) turns the MR 104c to EMR 115. The addition of the add-on modules is also presented for the MS 106 which turns it to EMS 108b. It should be noted that in accordance with certain embodiments, the SM 110 of the EMR 115 can be interfaced to each of the MR components, e.g. to the rMS 116 as described in FIG. 1a above or to the rRM 118 in order to enable addition of higher security applications (e.g. IP Services 719 of FIG. 10) as part of the Stand-Alone Subsystem that includes a moving core segment). Note also that in accordance with certain embodiments the ICM is coupled to the output (e.g. Antenna) of MS (106) for achieving cancellation of ambient interferences (e.g. interfaces originated from near MR. near SeNB, near MS etc). Note that in accordance with certain embodiments, the outputs (e.g. Antennae) of rBS or rMS modules (114, 116 respectively) are coupled with null steering module (.e.g. ICM) for achieving cancelation of interferences originated from mutual interferences of rBS and rMS, near MR. near SeNB, near MS etc for example as depicts in PCT patent application no. PCT/IL2011/000468 filed on Jun. 13, 2011 entitled "System and Methods for Null Steering in a Multicarrier System" FIGS. 5a-5b.

Figure 2:
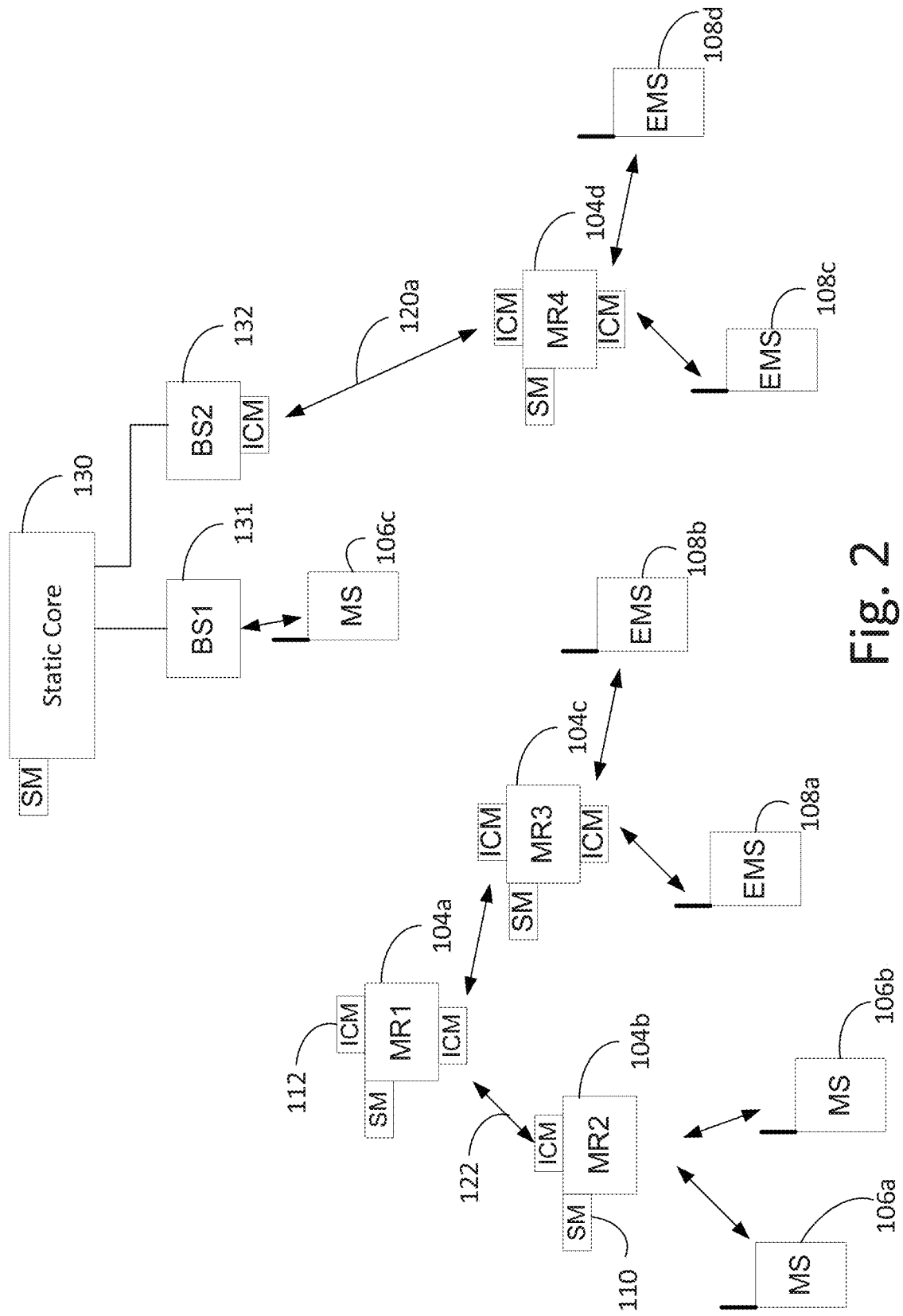
FIG. 2 illustrates schematically a generalized system architecture of the Moving Cellular Communication System that includes a stand-alone part and also a stationary cellular communication system part, in accordance with certain embodiments of the invention.

Turning now to FIG. 2, it presents a hybrid moving cellular communication system that includes a non-stationary (namely—moving) part having adaptive coverage and which includes MR1 104a, MR2 104b and MR3 104c. In addition to the non-stationary part, the presented system includes also a standard stationary part that consists of a static core 130 and stationary base-stations 131, 132. It can be seen, in accordance with certain embodiments the SM can be interfaced to the Core segment similarly to the interface to the rRM described at the end of last paragraph. The stationary part coverage area is further extended in a dynamic way using MR4 104d because MR4 104d is non-stationary and can move according to the needed coverage area defined by the location of the served MSs. In this figure, EMSs 108c and 108d are not located in the stationary part coverage area and by using MR4 104d they can be connected to each other and to a MS that is served by the stationary part, i.e. 106c.

Figure 3:
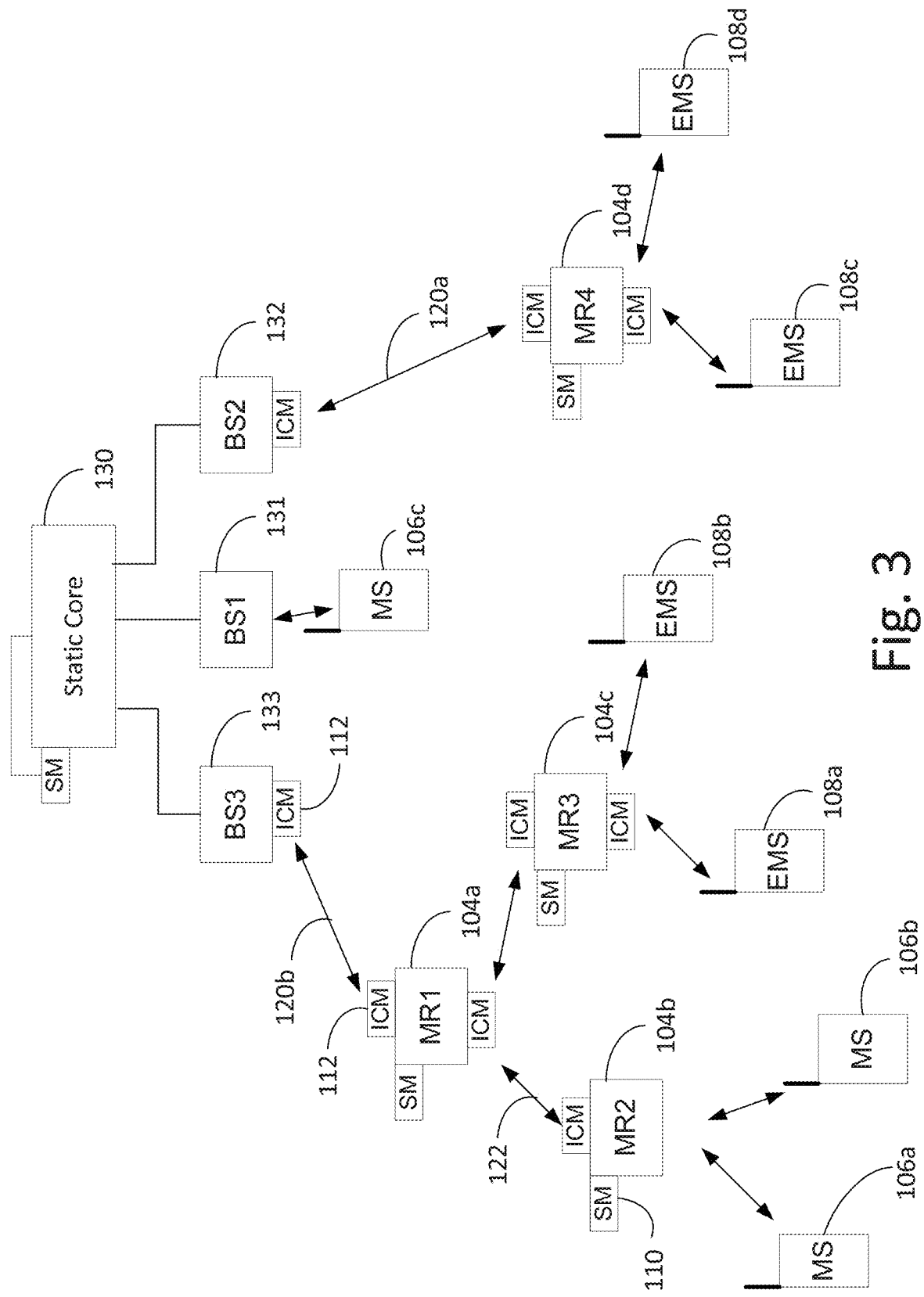
FIG. 3 illustrates schematically a generalized system architecture of the Moving Cellular Communication System that is connected to a stationary cellular communication system part, in accordance with certain embodiments of the invention.

FIG. 3 illustrates the capability of a non-stationary (moving) cellular system (that includes MR1 104a, MR2 104b and MR3 104c) to dynamically connect to a stationary cellular system when a component of the non-stationary network has moved to the coverage area of the stationary system. In the presented figure (for example), MR1 104a has moved to the coverage area of static BS3 133, then a link between MR1 104a and BS3 133 is formed 120b and any MS (or EMS) that is served by the non-stationary cellular system (i.e. every MS or EMS that is served by MR1 104a, MR2 104b and MR3 104c) can communicate with any MS or EMS that is served by the stationary cellular system (e.g. MS 106c) or any MS or EMS that is served by any other non-stationary cellular system that is connected to the stationary cellular system (e.g. MS 108c or 108d).

Figure 4:
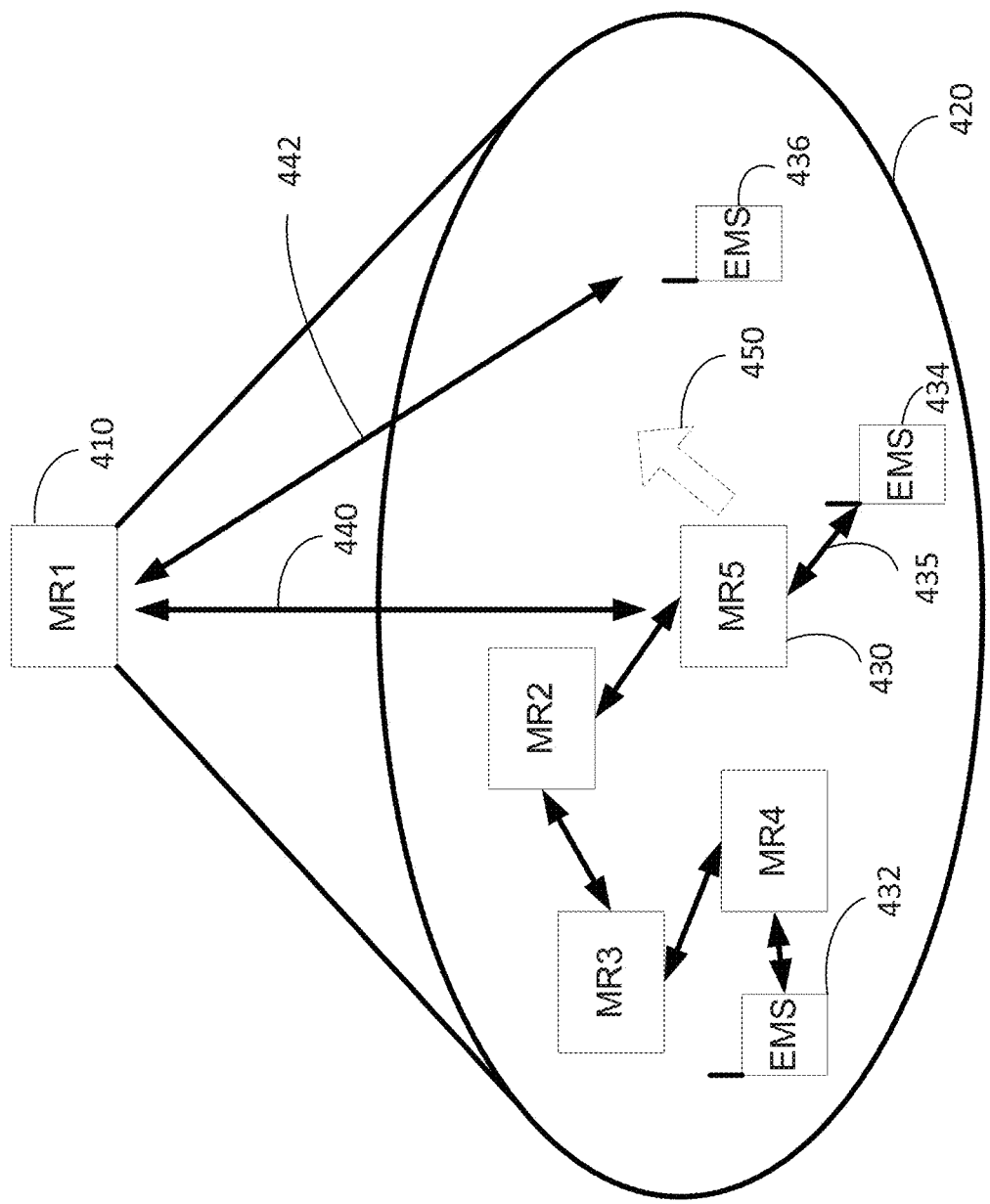
FIG. 4 illustrates schematically a scenario where a need to change the location of Moving Relay is apparent, in accordance with certain embodiments of the invention.

FIG. 4 displays a scenario in which a moving cellular system consists of several MRs (MR1, MR2, MR3, MR4 and MR5) that serve EMSs, namely 434, 434 and 436. MRs are used here as an example and some of them or all of them can be EMRs as well. MR1, which is in this example has a wide coverage area 420 (i.e. MR1 410 is mounted on-board airborne platform) is connected to EMS 436 and is also connected to MR5 430. The link between MR1 410 and EMS 436 is of poor quality and therefore MR1 410 can not support high data rate applications such as broadband data or video. In case EMS 436 needs such a high data rate application, this need is noted by MR1 410, and the moving cellular system calculates a new position of the MRs so that it can better serve the overall needs of all the MSs/EMSs (e.g. according to priorities or as proportionally fair or as per any appropriate criteria). In this particular case, the system calculated and determined that to better serve the overall requirement MR5 430 needs to move in the direction 450 of EMS 436. The MRs and/or EMRs can be mounted on-board manned vehicles/platforms (such as but not limited to trucks, vans, helicopter, boat) in which the person located in the platform can position the platform at a required location in order to better serve the MSs and/or eMSs. In addition, the MRs and/or EMRs can be located on-board un-manned vehicles/platforms (such as Unmanned-Air-Vehicle, ground robot, un-manned sea-borne vessel, etc.) in which it can be positioned (autonomously or remote controlled by an operator) at a desired location.

Figure 5:
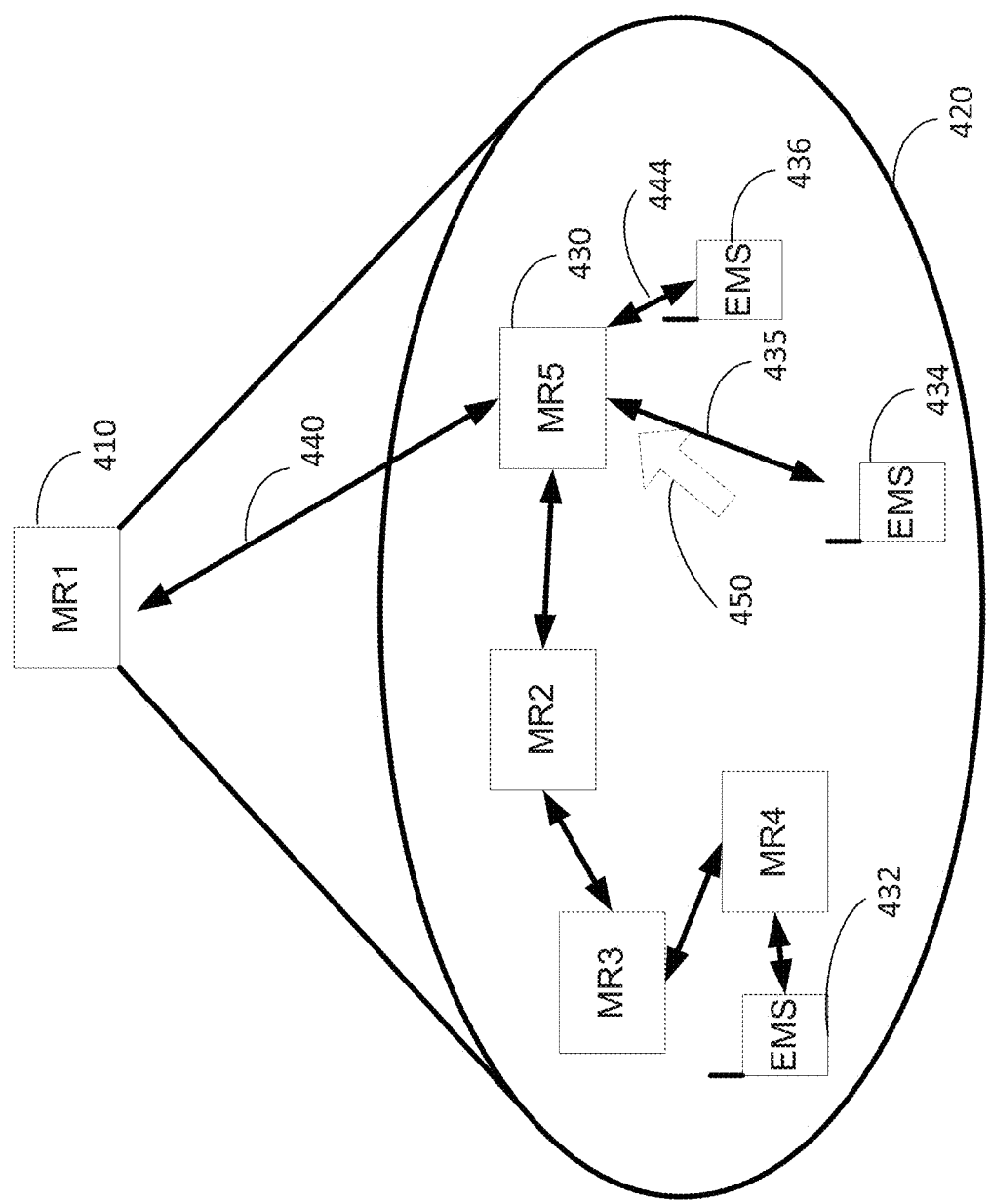
FIG. 5 illustrates schematically an adaptable network coverage scenario, in accordance with certain other embodiments of the invention.

FIG. 5 illustrates schematically an adaptable network coverage scenario, in accordance with certain other embodiments of the invention; It can be seen that MR5 430 has now moved 450 to the new calculated location that was indicated in FIG. 4. Now EMS 436 is connected directly 444 to MR5 430 and because of it is being closer it can support EMS 436 with higher data rate applications. It can be seen, for example, that MR5 430 keeps the connection 435 with its existing served EMS 434.

Figure 6:
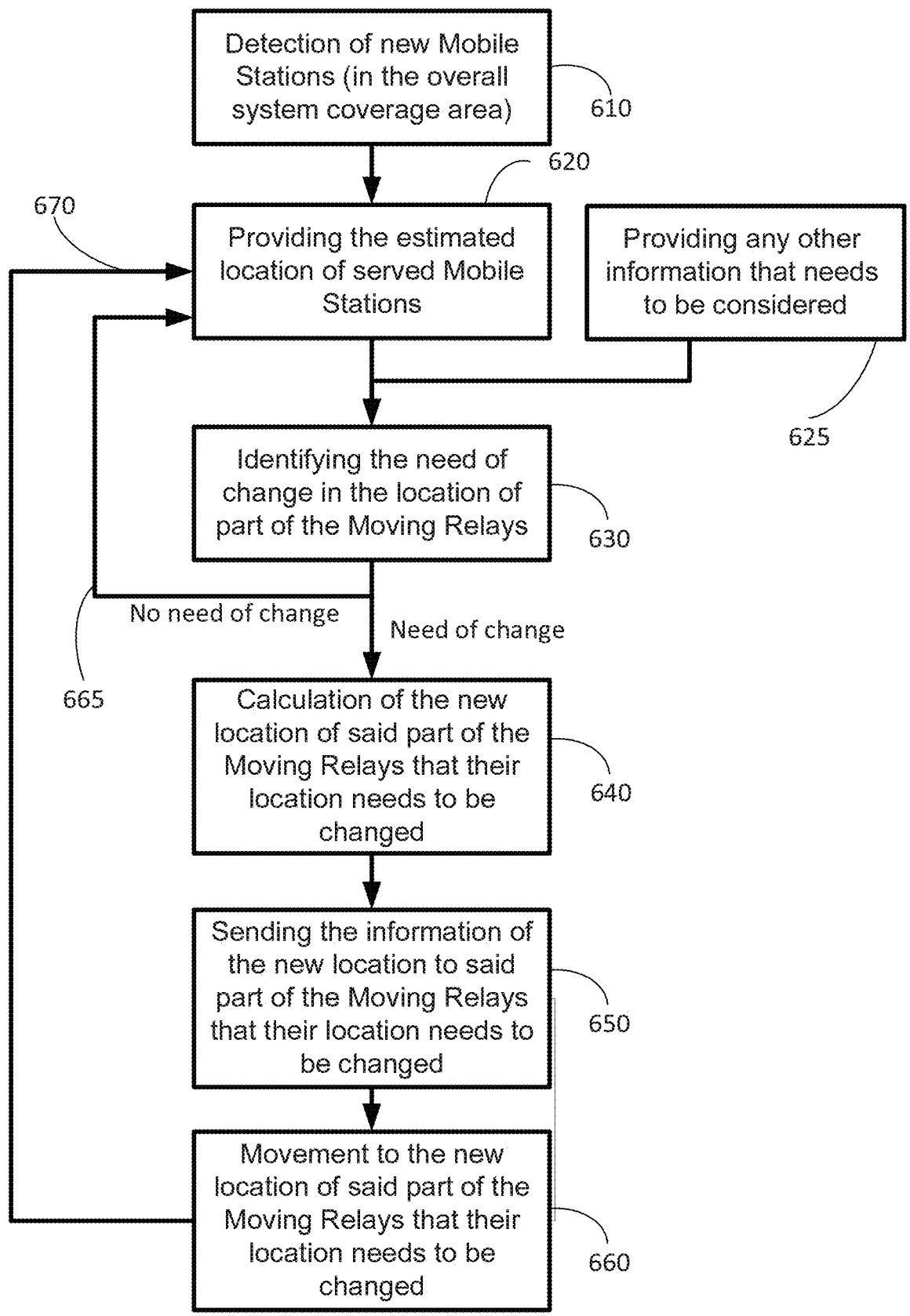
FIG. 6 illustrates schematically a flow chart of a sequence of operations for obtaining centralistic adaptable network coverage, in accordance with certain embodiments of the invention.

FIG. 6 illustrates schematically a flow chart of a sequence of operations for obtaining centralistic adaptable network coverage, in accordance with certain embodiments of the invention. The first step 610, which is optional, is a detection of new MSs/EMSs that can be served by any of the MRs of the moving cellular communication system. The detection can be implemented for example by airborne MR that has a wide coverage area and that can detect further MSs/EMSs that are not covered or served by ground MRs. Optionally, an additional list of MSs and/or EMS can be entered manually or remotely. After adding the new detected or manually/remotely entered MSs/EMSs to the list of the MSs/EMSs that needs to be served by the system, the next step 620 is to provide to the non-stationary (moving) cellular system the estimated location of one or more of the MSs/EMSs that it needs to serve. In accordance with certain embodiments, step 625 is implemented in which, in addition to location, any other information that needs to be considered can be provided to the non-stationary (moving) cellular system, such as but not limited to the required application for the MSs/EMSs, physical constraints of moving to a specific direction, the quality of service (such as signal-to-noise ratio, bit-error-rate, block-error-rate), the MS characteristics (such as but not limited to antenna performance and type and maximal transmitted power). The estimated location can be obtained by the non-stationary cellular communication system (e.g. using the standard positioning capabilities of the cellular network as for example described in 3GPP releases) or by any external system that can provide the estimated location of the MSs/EMSs to the non-stationary cellular communication system. The location can for example be obtained by the GPS location of each MS/EMS typically supports and sent to the cellular system. An additional optional method for estimation of the location of MSs/EMSs is by adding the MRs/EMRs with means for estimation of location of MSs/EMSs, that can be for example an antenna that can support estimation of direction-of-arrival of MSs/EMSs and by sharing that information estimated location for part of the MSs/EMSs can be obtained. Any other known method for locating MSs/EMSs can be used by the system (such as differential-time-of-arrival—DTOA). The estimated location of part or all of the MSs/EMSs are sent to and stored in a central location. Such a central location can be in example seen in FIG. 1 as one of the rRM 118 in one of the MR/EMR of the non-stationary cellular system. In this central location a test or computation is then executed to identify whether a change in the location of part or all the MRs/EMRs is required. If no change is required, as a result of this test 665, then the flow returns to the previous step 620. Otherwise, the next step is the calculation of the new location of the part (or all) the MRs that their location needs to be changed 640. The identification step 630 and calculation step 640 can be based on several criteria such as weighted sum of parameters such as the location of the MSs/EMSs, and any abovementioned information or parameter that is provided to the system (i.e. quality of service). Alternatively a tracking method can be used for tracking a single of a group of MSs/EMSs by a single or group of MRs/EMSs. The new calculated location of each MR that its location is needs to be changed is then sent to it 650. Sending the new location can be made using the non-stationary cellular system communication links or by any other external means (e.g. other wireless system, WiFi®, satellite communications, other cellular system, microwave link, etc.). Then each of the MRs/EMRs that needs to change their location move to the new location 660. Thereafter the flow returns 670 to step 620.

FIG. 7 illustrates schematically a flow chart of a sequence of operations for obtaining distributed adaptable network coverage, in accordance with certain other embodiments of the invention. In this distributed manner each of the MRs/EMRs decides by its own the need to change its location. This flow chart describes an example of an algorithm that is executed by the MR/EMR. Hereafter the discussed specific MR/EMR that is referred will be called "current MR". The first step (optional) is a detection of new MSs/EMSs by the current MR 710. The next step is then to provide to the current MR the location of the MSs/EMSs that it needs to serve (and any additional information with regard to them that can be accounted for in the following steps) and the location of neighboring MRs/EMRs 720. The ways to provide the location have already been described in the description of FIG. 6. In accordance with certain embodiments, step 725 is implemented in which, in addition to location, any other information that is to be considered can be provided to the current non-stationary (moving) relay. Description of such information is given in the description of FIG. 6. In addition, optionally, the MRs/EMRs share their relevant information (including location information) with other MRs/EMRs. The location information (and additional information) is then tested and computed to identify the need of change in the current MR 730. If no need of change is the result 765, then the flow returns to the previous step 720. Otherwise the flow proceeds to the calculation step 740. In the calculation step 740 the new location of the MR/EMR is calculated (methods for calculations are described in FIG. 6). Then the MR/EMR moves to the new location 750. Thereafter, optionally, the new location of the MR is sent to the neighboring MRs 760. And finally the flow returns 770 to step 720.

In accordance with an aspect of the presently disclosed subject matter, there is provided a moving cellular communication system comprising at least one moving relay including at least one base station functionality and at least one mobile station functionality and a relay resource manager, all co-located, at least one stand-alone moving relay from among the moving relays further including a simulated stationary network that includes a simulated IP connectivity gateway operative to communicate with a simulated mobility management entity; the simulated stationary network simulates the operation of a stationary network; the stand-alone moving relay being a root of a sub tree that includes at least one moving relay and at least one mobile station, and is configured to utilizing its mobile station functionality, base station functionality and radio manager for operating in at least the following modes of operations:

(i) normal mode of operation wherein the stand-alone moving relay communicating with other relays in the network and with the stationary network;

(ii) in response to an stand-alone event, operating in an stand-alone mode of operation, including a. communicating to a designated mobile station in the sub-tree each message that was received from a moving relay or a mobile station in the sub-tree and the message having an IP address of the designated mobile station; or b. communicating to the simulated stationary network each message that was received from a moving relay or a mobile station in the sub-tree and having an IP address that does not match any mobile station in the sub-tree.

In accordance with an embodiment of the presently disclosed subject matter, there is further provided a system, wherein the simulated stationary network further including simulated at least one application having respective application IP address, and wherein the operating in an stand-alone mode of operation, further including communicating to a designated application in the simulated network each message that was received from a moving relay or a mobile station in the sub-tree and the message having an IP address of the designated application.

In accordance with an embodiment of the presently disclosed subject matter, there is further provided a system, wherein the simulated stationary network further includes a simulated router.

In accordance with an embodiment of the presently disclosed subject matter, there is further provided a system, wherein the stand-alone event includes detecting disconnection of the stand-alone relay from the stationary network.

In accordance with an embodiment of the presently disclosed subject matter, there is further provided a system, further comprising, in response to undo stand-alone event, the stand-alone relay is configured to revert to operate in accordance with the normal mode.

In order to address the challenges described above, we need to define architecture and methods to cope with the need to transfer control and traffic information between each one of the mobile stations, through any hierarchical cellular topology to any destination that can be a mobile station in the same network or any destination outside the network. In the rest of the description we will present the solution for the 4G 3GPP cellular network, also known as LTE (Long Term Evolution), but the same principles can be applied to any hierarchical cellular network (i.e. based on 3G standard).

In existing LTE cellular network each mobile station is identified by its own IP, a packet that is addressed to a mobile station is being routed through P\S-GW using a GTP tunnel to the base station and from there to the mobile station.

In a hierarchical cellular network as described in the specified applications the packet is being routed through several tunnels and being routed to the destination mobile station.

The proposed invention is a mobile relay which is also capable of providing IP-based services in case of a stand-alone event. An example of a stand-alone event might be a disconnection from the core network.

Normally, in LTE cellular networks when a mobile station connects to the core network, it gets a default bearer and an IP assignment. When a mobile station requests a new service, it gets an assignment of another, dedicated bearer. Each assigned bearer has specified QoS rules such as maximal delay, packet loss rate, GBR and queuing priority. The bearers are mapped to tunnels where every user packet that flows in the cellular network from the mobile station to the core and from the core to the mobile station is mapped into a unique tunnel being scheduled by using the tunnels bearer assignment. In order to reflect bearer requests of the mobile station, the mobile station functionality of the moving relay gets bearer assignments that are corresponded to the ones of its connected mobile station.

FIG. 8 is another example of normal mode of operation for multi-hop relaying scenario, where the two relays' base station functionalities [158,156] and the static base station [167] comprises a tunnel termination point; the corresponding tunnels are [160,153,154]. These tunnels typically transfer in the upstream direction mobile station [150] data that is sent to the relay's base station functionality [158] over the air-interface [162] to the core IP connectivity gateway/s. In the downstream these tunnels typically transfer data from the IP Connectivity gateway/s [166] to the relay's base station functionality [158] to be sent over the air interface [162] to the mobile station [150].

Figure 9A:
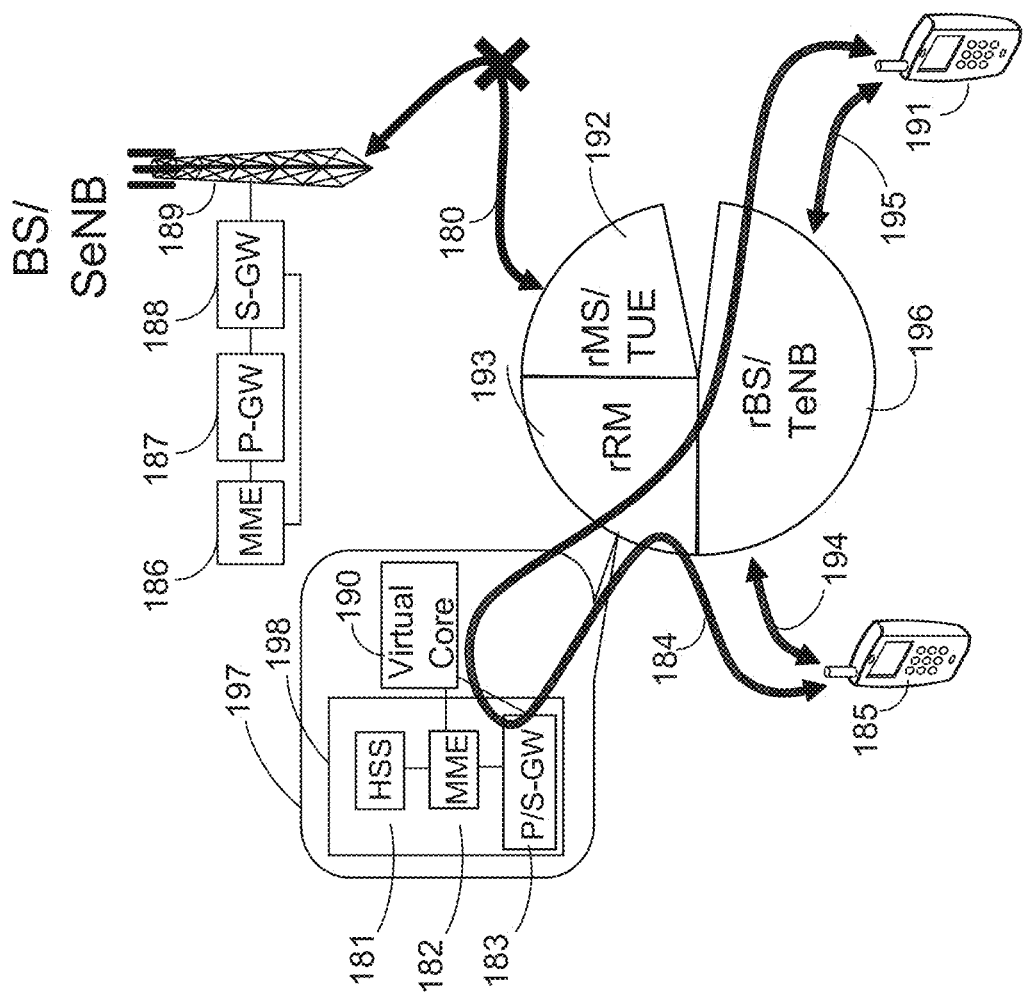
FIG. 9a is an example of two mobile stations communication in an emergency mode.

FIG. 9a is an example of an emergency moving relay operating in emergency mode. The backhauling radio link [180] between the moving relay and the static base station [189] was disconnected; as a result the local relay radio manager (rRM) [193] addresses communication data being designated to mobile stations [185,191] that are under the local relay radio manager's sub tree using the simulated network e.g. Stand Alone Subsystem as described herein.

The tunnel that was originally to be terminated at the core network P/S-GW [187,188] (the tunnel that was connecting the static network core P/S-GW [187],[188] to the relay's base station functionality (rBS) [196], whose tunnel header destination address was P/S-GW [187,188]) is terminated in the local simulated P/S-GW [183], e.g. its tunnel header destination address is set to P/S-GW[183]).

Figure 9B:
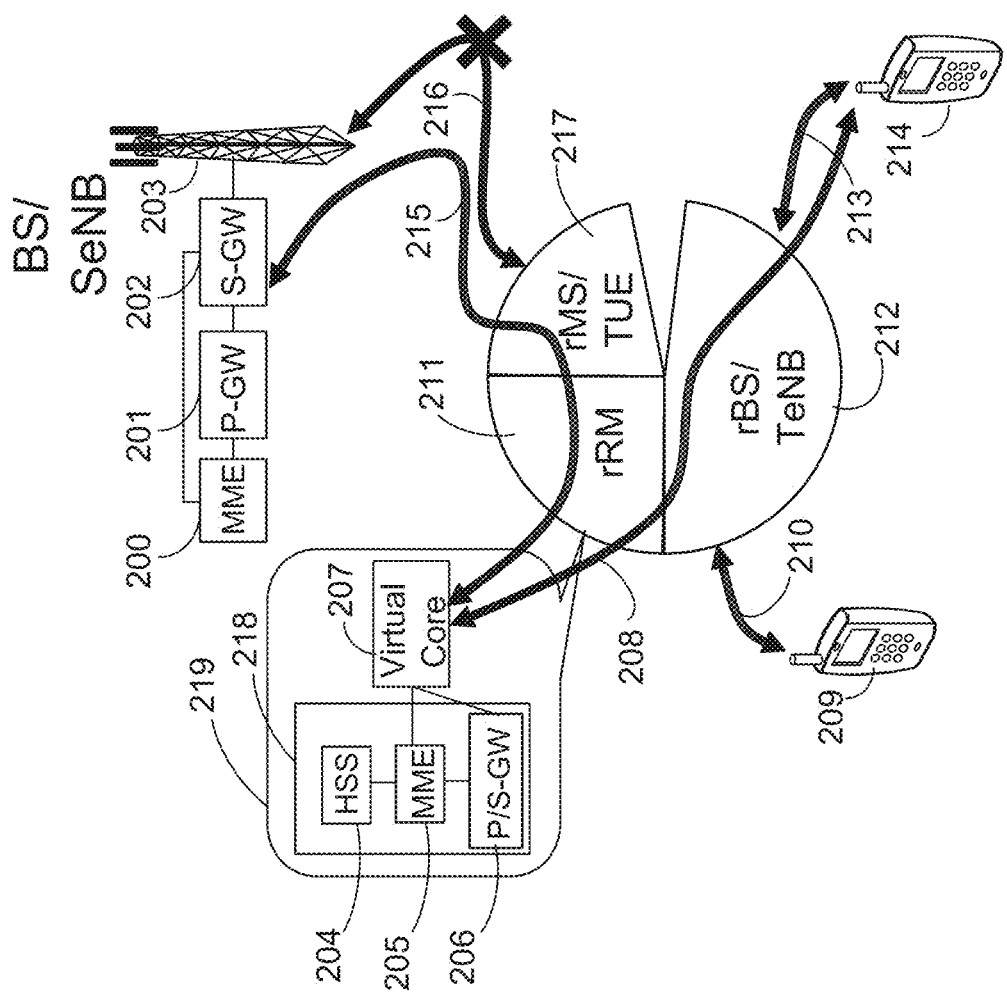
FIG. 9b is an example of two mobile stations communication in an after undo emergency mode.
Figure 9C:
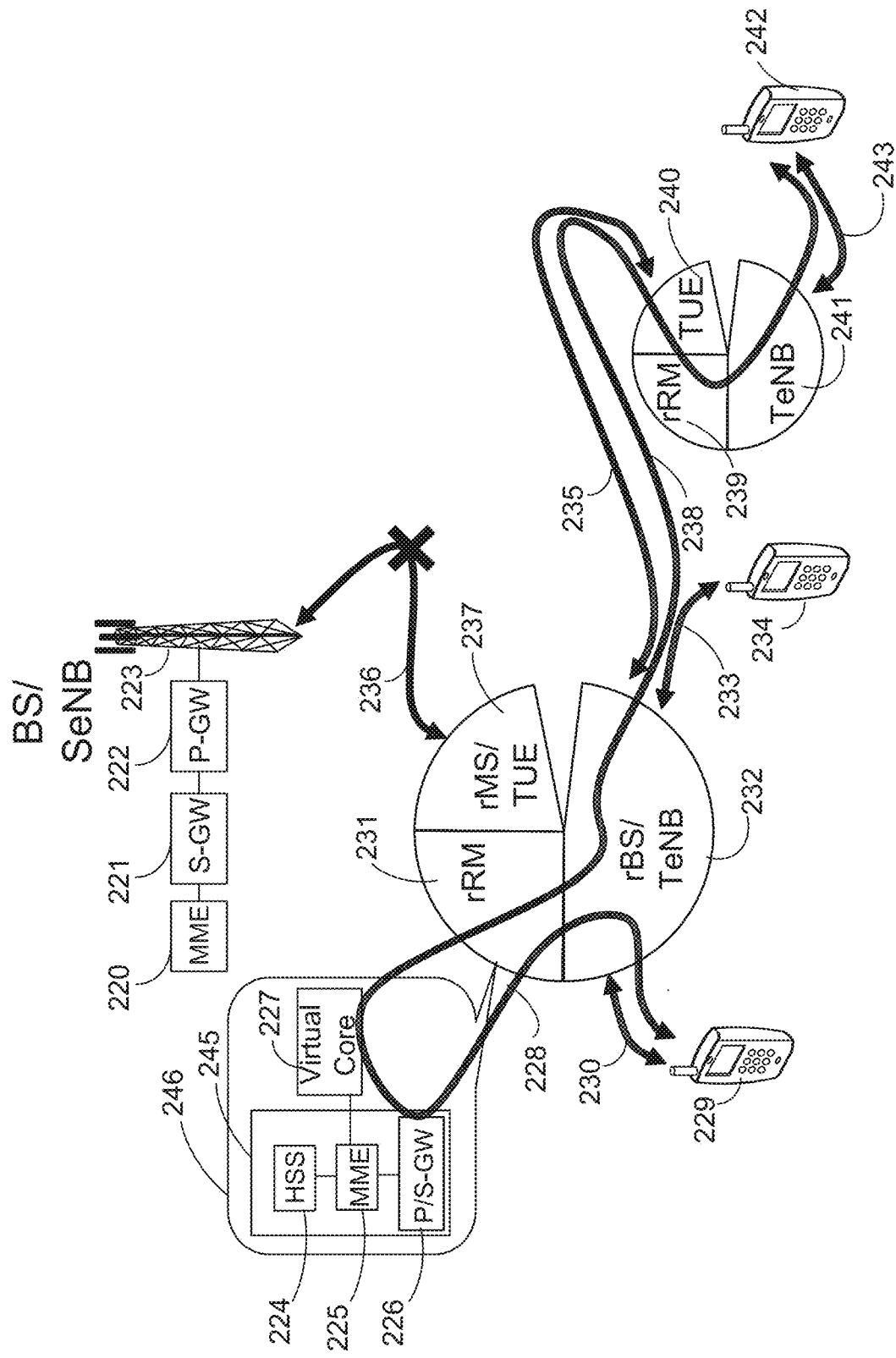
FIG. 9c is an example of three mobile stations communicating in an emergency mode in a multi-hop scenario.

FIG. 9c is an example of communication in an emergency mode in a multi-hop scenario. The tunnel that was originally to be terminated at the core network P/S-GW [187,188] is now terminated by the root of the disconnected moving relay sub-tree that simulates the core network [224,225,226]. The second moving relay [239,240,241] and the anchored mobile stations [239,234,242] are unaware of the emergency event.

FIG. 9b is an example of an undo emergency event. This undo emergency event may for example be initiated as a result of a connection being made between the relay mobile station functionality and one of: a static base station connected to static core or other relay base station functionality having active simulated core (for example, a mobile station functionality is now able to connect to the stationary core). The disconnected radio link [216] is restored and the relay radio manager [211] relays communication data back to the core network [200,201,202].

On each relay node, the sibling nodes are stored e.g. in a local table in the Routing agent. Each mobile station [229, 234, 242] associates its data streams with a bearer. Each bearer is typically associated with a traffic filter template (TFT) that includes the bearer's source address, designated node address and an optional addition of source, destination port and protocol. Typically, each bearer is uniquely marked with a Tunnel ID (TID). In the example illustrated in FIG. 9c, mobile station [242] connects to mobile station [229] e.g. using a voice over IP (VoIP) application. On a hop by hop basis, each relay node inspects the bearer establishing procedure and is operative to store a sibling node and its associated TID. In case of a disconnection [236] from the core [200,201,202] the relay resource manager (rRM) [231] functionality in the relay which resides at the head of the tree (i.e. but not limited to the relay closest to the disconnected core) is operative to locally route communication between designated nodes that are in the disconnected nodes' cluster or optionally additionally to provide services to mobile station/s in its topology tree. So, in the illustrated example, mobile station [229, 234, 242] are camped to the disconnected nodes' cluster (group of relays that are inter-connected) of relay nodes [RN1,RN2]. The relay resource manager (rRM) [231] functionality of RN1 (RN=RELAY NODE=RELAY) which resides at the top of the tree routes the communication between mobile station [229] and mobile station [242]. Furthermore, because the communication is based on GPRS tunneling, the relay resource manager (rRM) [231] can alter each tunnel, so that it can enable to communicate with the source and the destination of the tunnel, e.g. by creating an alternative using a GTP-C standard [e.g. 3GPP TS 29.274] tunnel by sending a create packet data protocol (PDP) context, Create Bearer Request to its collocated core. When an undo emergency event is received, the relay resource manager (rRM) [231] can use the same mechanism. So, the relay resource manager (rRM) may be operative for creating an alternative using a GTP-C standard [e.g. 3GPP TS 29.274] tunnel by sending a create packet data protocol (PDP) context,) to alter the local (emergency-mode) tunnels to the original tunnels (normal-mode).

It is appreciated that in case of an emergency event the relay located at the root (head) of the topology tree (e.g. the relay which first caught the event or the node closest to the core) enables a local EPC core (simulated core network/ Stand-alone subsystem) and functionally replaces the stationary or remote-simulated core [FIG. 9c, 220, 221, 222]. All other relay nodes in the topology tree and their connected mobile stations are seamless to the disconnection (e.g. if no connection is to be established with any entity outside the topology tree). The disconnection may also be indicated by informing idle mode mobile stations (MSs) e.g. by changing a public land mobile network (PLMN) ID to another public land mobile network (PLMN) and broadcasting the ID to all Base station functionalities (TeNb) in the cluster. The public land mobile network (PLMN) may also indicate relevant information such as the ID of the head relay and the number relay in the cluster. It is appreciated that the term EPC refers to an all-IP mobile core network for LTE communication.

Figure 10:
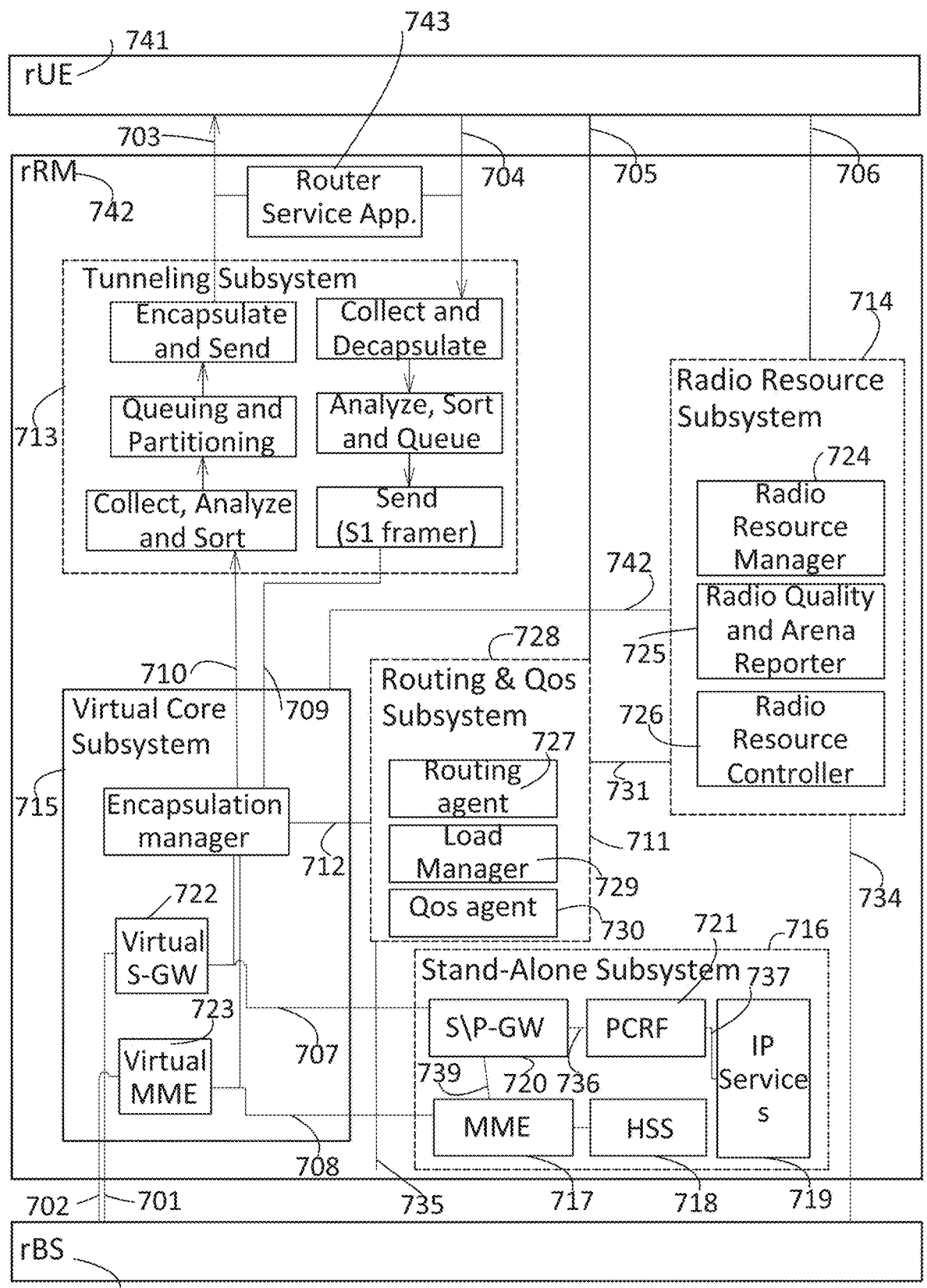
FIG. 10 is a simplified block diagram of an example architecture for the relay resource manager (rRM) of MR.

FIG. 10 is a simplified block diagram of an example architecture for the relay resource manager (rRM) of MR. The terms "stand-alone subsystem", "simulated stationary network", "core functionality", mini-core and simulated core are used herein interchangeably.

As shown, the relay resource manager comprises some or all of: a Tunneling subsystem [713], Radio Resource subsystem [714] Virtual core subsystem [715], internal router service application [743], Stand-Alone Subsystem [716] and Routing and QoS Subsystem [728], suitably coupled e.g. as shown.

The tunneling subsystem is operative for encapsulating and de-capsulating of user plane and control plane payloads over user plane bearers according to different priorities and sending the de-capsulated user plane and control plane payloads to entities in the core such as but not limited to any of: mobility management entity e.g. MME, gateways, and application servers. The tunneling subsystem typically interfaces [703, 704] with the mobile station functionality rUE [741] e.g. over a standard IP stack. The Virtual core subsystem typically constitutes the gateway between the core (stationary) on the one hand, and various resource management subsystems and the base station functionality rBS [740'] on the other hand. The Virtual core subsystem may communicate with the base station functionality rBS [740'] or core (of the static network) e.g. using standard S1-MME [702,708b,709,710] and S1-U [701,707b,709,710'] or proprietary management and control (M&C) over IP interface [701,707b,709,710'] with the base station functionality rBS [740'] and remote core. The Virtual core subsystem may send all or any of the S1-MME, S1-U, M&C messages to the core optionally through the Tunneling Subsystem [713].

The Encapsulation manager function of the Virtual core subsystem [715] implements a Network event listener e.g. as illustrated in FIG. 6 at reference numeral 1304 and a Network event handler e.g. as illustrated in FIG. 6 at reference numeral 1305]. The handler may use deep packet inspection techniques in order to maintain suitable statistics (such as but not limited to any or all of: all active bearers including source and destination addresses, ports, and priorities) The handler may also raise events (for example in case of a disconnection from the core). The encapsulation manager is also operative for handling (send/receive) different messages that are sent/received [712] by the Routing and QoS Subsystem to/from the core being used, for example messages to create or delete a bearer.

In addition, the Encapsulation manager function of the Virtual core subsystem [715] may optionally include functionality for exchanging information between the relay resource manager rRM that the Virtual core subsystem resides within [742] and: (1) another relay resource manager located inside another relay, and/or (2) Relay/s Server located as part of the static network. The Virtual S-GW [722] and Virtual MME [723] may have corresponding standard S-GW and MME interfaces with the base station functionality rBS [740'] accordingly. If a remote core is used by the relay, the Virtual S-GW [722] and Virtual MME [723] may emulate these core functions as proxies so that the base station functionality rBS [740'] works smoothly and seamlessly despite remoteness of the core.

The Routing & QoS subsystem [728] may comprise some or all of a routing agent [727], Load manager [729] and QoS Agent [730']. Routing & QoS subsystem [728] communicates with the mobile station functionality (rMS) [741] e.g. using AT Commands or any suitable proprietary interface [705]. Routing & QoS subsystem [728] communicates with the base station functionality rBS e.g. using the M&C interface [735]. Using the M&C interface the Routing and QOS subsystem may command a change in various parameters in the base station functionality rBS [740'] such as PLMN, and/or may command the base station functionality rBS [740'] to initiate a handover mechanism of an attached mobile station. Using the mobile station functionality (rMS) [741] interface [705] the Routing and QoS subsystem [728] may receive radio measurements of served base stations or neighboring base stations, and may send fake radio measurements to the mobile station functionality (rMS) [741] that the mobile station functionality may send to its serving base station in order to intervene with the handover mechanism. Routing and QoS subsystem [728] may register to specific access point names (APN) and/or create additional bearers.

The Load manager [729] is operative for balancing traffic loads between different relays. Load manager [729] may perform actions such as but not limited to: indicating other relay resource manager elements such as but not limited to any or all of: Radio Resource Subsystem [714], Routing agent [727], QoS agent [730'] or Encapsulation manager (block of the Virtual Core Subsystem [715]) or mobile station functionality [741] or base station functionality rBS [740'] or mobility management entity MME of remote core (of the static network or) that which current site loaded. Load manager [729] may also command the routing agent to try to change topology in order to gain more bandwidth (at the backhauling link), or to request that additional bandwidth be assigned to the mobile station functionality (rMS) for the backhauling link from the mobility management entity MME of remote core.

The QOS agent [730'] is operative for creating bearers according to the current attached mobile stations and their bandwidth requests in case there is a need for a additional bearer due to the multi-hop mechanism.

The Radio Resource Subsystem [714] may comprise some or all of: Radio resource manager [724], Radio Quality and Arena Reporter [725'] and Radio Resource Controller [726]. The radio resource subsystem [714] is operative for reducing interference between: (1) relay's access links which may be sent and received by the base station functionality rBS [740']) and relay's backhauling links which may be sent and received by the rUE (rMS) [740']; (2) relay's access links and other relays' access links; and (3)

relay backhauling links and other relays' backhauling links. The Radio resource controller [726] is operative for controlling different radio resources of the mobile station functionality rUE [741] and of base station functionality rBS [740'] e.g some or all of: lower base station functionality transmission power, blanking particular base station functionality resource blocks/subframe/s, request for mobile station functionality uplink grant, changing center frequency, changing bandwidth.

The Radio Quality and Arena Reporter [725'] may be operative for gathering a radio measurement report indicating received power reports of the base station functionality rBS [740'] and base station functionality rBS's neighboring base stations from the connected mobile stations reporting to the base station functionality rBS [740'] and from the mobile station functionality rUE [741]. The radio measurement report may indicate one or more of: the mobile station functionality's serving base station's radio measurements; and/or radio measurements of mobile station functionality rUE [741]'s active set, e.g. list of neighboring base stations that mobile station functionality rUE [741] is operative to measure periodically. The Radio Resource Subsystem sends the measurement report through the interface to the Virtual Core subsystem [742], typically using the encapsulation manager, to radio resource subsystems of other relays' relay resource managers as a radio quality report. This radio quality report may be relevant for distributed radio resource management mechanisms and/or for decisions relevant to the routing agent.

The radio resource manager may receive radio quality reports from the radio resource manager's local Radio quality and arena reporter [725'] and from neighboring relays' Radio quality and arena reporters. The radio resource manager may compute the level of interference between the various stations, e.g. of relays and optionally of the static network. The radio resource manager may also provide radio resource configuration recommendations to its local radio resource controller [726] and/or to its neighboring relays' radio resource controller/s through interface [742] and using the encapsulation manager of the Virtual core subsystem [715].

The Radio resource manager [714] can optionally communicate in interface [706] e.g. using AT Commands or other proprietary protocol with the mobile station functionality rUE [741]. The Radio resource manager can further optionally communicate in interface [734] e.g. using M&C protocol with the base station functionality rBS [740']. The Radio resource manager can further optionally communicate with other relays' radio resource subsystems through interface [742] e.g. using the virtual core subsystem [715] Encapsulation manager.

The Stand-alone subsystem [716], also termed herein the Simulated core network, is responsible for core packet switching & handling and for IP services. The Stand-alone subsystem [716] may serve as a local core also termed herein a mini-core since it may have less functionality than the static core does. Stand-alone subsystem [716] may also be operative for giving local services, such as local storage of maps and/or being a voice call server or/and SIP server and/or video server and/or gaming server, e.g. through the IP services function [719], in the event of handoff e.g. when the relay disconnects from the remote core (either static or part of other relay rRM) from the serving core. If such handoff occurs, the virtual core subsystem [715] may recreate all relevant PDP contexts and bearers according to the information stored on the virtual core subsystem's [715] encapsulation manager and switch the packet data to the local stand-alone subsystem [716]. When the local Stand-alone subsystem is used as an active core, and there is need in a given situation, to re-use the remote core instead of the local core, a reverse process performed.

Tunneling Subsystem [713], Routing & QoS Subsystem [728] and Radio Resource Subsystem [714] are optional subsystems of the relay resource manager (rRM). All or any subset of these subsystems can be added to the relay resource manager (rRM) as per need.

The router service application [743] can be added to the relay to enable it to do extended tunnels for multi-hop encapsulation. According to certain embodiments, one mobile station is connected to a core functionality of the relay resource manager and another mobile station is connected to the core element of the static network, and there is a link between these cores.

If a mobile station that is attached to a stationary base station or even a standard phone communicates with a mobile station that is attached to the core through several relays e.g. as depicted in FIG. 8, the mobile station attached to a stationary base station may connect e.g. using conventional interfaces to the P-GW and from there by hopping through [164] the static base station SeNB [167], the first relay node TUE[155], relay resource manager rRM [163] and base station functionality TeNB [156]. The second relay's mobile station functionality TUE [157], the relay resource manager rRM [159] and the base station functionality TeNB [158] are typically able to communicate with the mobile station [150].

Any suitable IP connectivity gateway may be used herein, not being limited to what is specifically shown and described herein, such as but not limited to one of: an IP-connectivity GW in LTE; one of a P-Gateway, S-Gateway, P/S-Gateway and Access-Gateway; in 3G GGSN, an SGSN, in WIMAX®, an ASN-Gateway in CSN;

Any suitable mobility management entity may be used herein, not being limited to what is specifically shown and described herein, such as but not limited to one of: an LTE MME, a 3G RNC, and a WIMAX® ASN.

The router service application [743] can be implemented as a software application, or alternatively as a hardware router.

Note that the invention is not bound to the specified aspects and embodiments and accordingly any combination thereof is also applicable.

The invention likewise is directed to various counterpart method embodiments and aspects, mutatis mutandis.

The invention likewise is directed to a computer storage medium for storing computer code portions for performing the method stages.

The present invention has been described with certain degree of particularity, but those versed in the art will readily appreciate that various alterations and modifications may be carried out without departing from the scope of the following Claims.

The invention claimed is:

1. A cellular system comprising:
   at least one moving relay (MR) comprising a base station, configured to provide cellular communication between at least two mobile stations (MSs) in a geographic area that lacks adequate cellular coverage by at least one stationary base station, the cellular system configured to perform the following:
   a) receive information indicative of the location of at least one MS of the at least two MSs;
   b) receive information indicative of the location of the at least one MR;

c) determine whether or not a change in the location of the at least one MR is needed, the determination being based at least on the information indicative of the location of the at least two MSs and the information indicative of the location of the at least one MR;

d) in response to determining that the change in the location is required, performing the following:
  (i) calculate a new desired location of the at least one MR, based at least on the information indicative of the location of the at least two MSs and the information indicative of the location of the at least one MR, the location of the at least one MR to constitute a previous location of the at least one MR; and
  (ii) send an instruction to the at least one MR to move to the new desired location, wherein said steps (a) to (d) are performed at a central location, wherein the at least one MR comprises an MR that is located at a new desired location other than the central location, wherein the determining, at the central location, that the change in the location is required, and the calculating, at the central location, of the new desired location, are based on serving overall requirements of the at least two mobile stations, thereby enabling movement of the at least one MR to the new desired location, thereby enabling providing of improved service to the at least two MSs, as compared to a previous service provided when of the at least one MR located at the previous location.

2. The cellular system of claim 1, wherein the improved service comprises at least support of a higher date rate.

3. The cellular system of claim 1, further comprising repeating said steps (a) to (d) at least once.

4. The cellular system of claim 1, wherein the receiving information indicative of the location of the at least two MSs comprises at least one of:
  receiving the information from the at least one MR, the at least one MR equipped with an antenna that can support estimation of direction-of-arrival of the at least two MSs;
  receiving GPS information associated with the at least two MSs utilizing 3GPP standard positioning capabilities; and
  receiving the information from an external system.

5. The cellular system of claim 1, further comprising at least one neighboring MR,
  wherein said step b) further comprising receive information indicative of the location of the at least one neighboring MR,
  wherein said steps (c) and (d)(i) are performed at least partly based on the information indicative of the location of the at least one neighboring MR.

6. The cellular system of claim 1, wherein the sending of the instruction to the at least one MR utilizes at least one of: cellular system communication links to a mobile station comprised in the at least one MR; WI-FI; satellite communications; a microwave link.

7. The cellular system of claim 1, wherein said steps (a) to (d) being performed in the at least one MR, wherein said step (d) further comprises:
  (iii) move autonomously to the new desired location.

8. The cellular system of claim 7, wherein said step (d) further comprises:
  (iv) send information to the at least one neighboring MR, the information comprising at least one of:
  the information indicative of the location of the at least one MR;
  the new desired location of the at least one MR;
  the information indicative of the location of the at least two MSs;
  the information indicative of the location of the at least one neighboring MR.

9. The cellular system of claim 1, further comprising performing, prior to said step (a), the following:
  e) detect at least one new MS, not already served by any MR of the at least one MR; and
  f) set the at least two MSs to comprise the at least one new MS.

10. The cellular system of claim 9, further comprising an airborne MR, wherein the detection of the at least one new MS utilizes the airborne MR, the airborne MR having a first coverage area wider compared to a second coverage area associated with a ground MR.

11. The cellular system of claim 1, wherein said step a) further comprises receiving additional information, comprising at least one of:
  a required application associated with the at least two MSs;
  a quality of service;
  antenna type associated with the at least two MSs;
  antenna performance associated with the at least two MSs;
  maximal transmitted power associated with the at least two MSs;
  physical constraints of motion of the at least one MR,
  wherein said steps c) and d)(i) are performed at least partly based on the additional information.

12. The cellular system of claim 1, wherein the at least one MR is carried by a moving autonomous platform from a group that includes ground robot, unmanned aerial vehicle (UAV) or unmanned seaborne vessel.

13. The cellular system of claim 1, wherein said cellular communication is configured to support applications including at least one of audio, video, messaging and data.

14. The cellular system of claim 1, operable in 4G standard.

15. The cellular system of claim 1, operable in 3G standard.

16. The cellular system of claim 1, operable in WiMAX® standard.

17. The cellular system of claim 1, wherein the determining and the calculating, based on serving the overall requirements of the at least two mobile stations, comprises considering at least one of priorities and proportional fairness.

18. The cellular system of claim 1, wherein the at least one MR comprises a plurality of MRs,
  wherein the determining, at the central location, that the change in the location is required, and the calculating, at the central location, of the new desired location, are based on a consideration of performance of the plurality of MRs.

19. The cellular system of claim 18, wherein the central location is comprised in an MR of the plurality of MRs.

* * * * *

UNITED STATES PATENT AND TRADEMARK OFFICE
CERTIFICATE OF CORRECTION

| | | |
|---|---|---|
| PATENT NO. | : 11,463,152 B2 | Page 1 of 1 |
| APPLICATION NO. | : 16/986637 | |
| DATED | : October 4, 2022 | |
| INVENTOR(S) | : Yaakov Shoshan et al. | |

It is certified that error appears in the above-identified patent and that said Letters Patent is hereby corrected as shown below:

In the Claims

Claim 1, Column 15, Line 28, please delete "previous service provided when of the at least one MR located at the previous location" and add --previous service provided of the at least one MR located at the previous location--.

Signed and Sealed this
Fourteenth Day of January, 2025

Derrick Brent
*Acting Director of the United States Patent and Trademark Office*